UNITED STATES PATENT OFFICE.

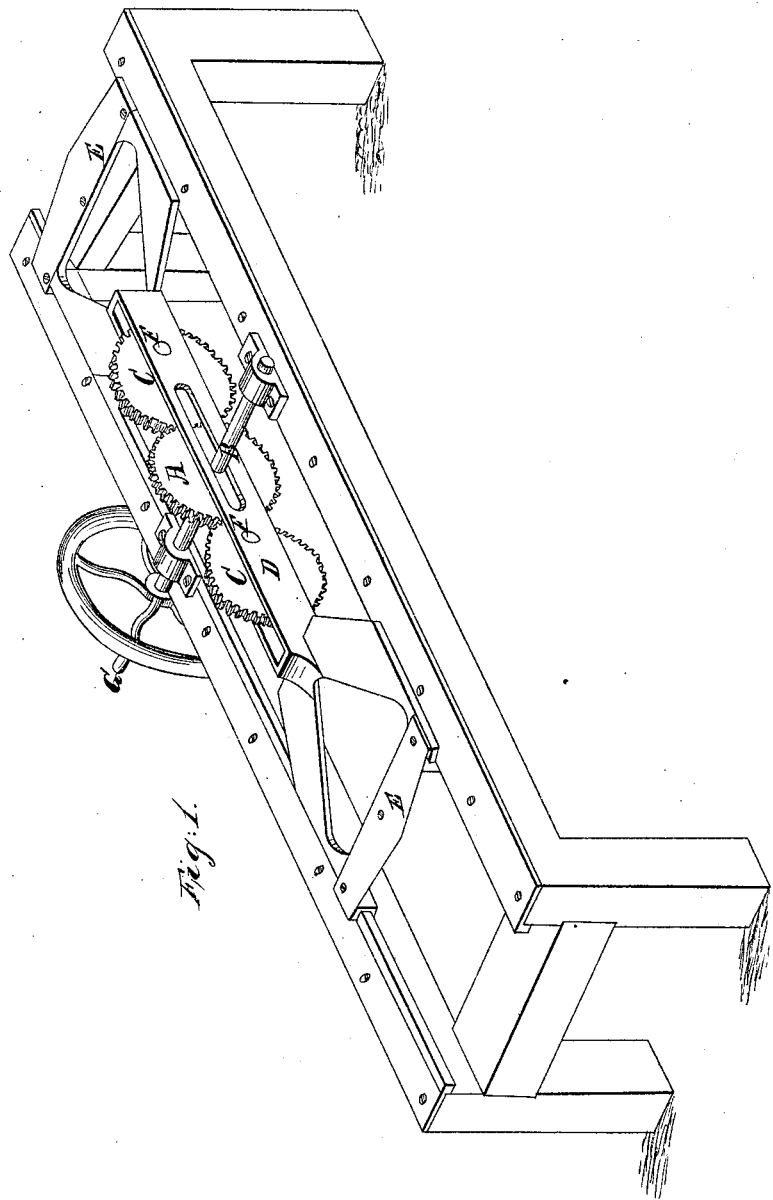

DAVID M. BOYD, OF INDIANAPOLIS, INDIANA.

SHINGLE-MACHINE.

Specification of Letters Patent No. 19,233, dated February 2, 1858.

*To all whom it may concern:*

Be it known that I, DAVID M. BOYD, of the city of Indianapolis, in the county of Marion and State of Indiana, have invented a new and useful Improvement in Working Shingle, Lath, Stave, and other Machines Requiring a Reciprocating Motion; and I do hereby declare that the following is a full, clear, and exact description of the same, reference being had to the accompanying drawing, marked Figure 1, and forming part of this specification.

To enable others skilled in the art to make and use my improved movement for producing a reciprocating motion I will proceed to particularly describe its construction and operation.

The power being applied at G, the shaft B, is revolved. The wheel A, is firmly attached to the shaft B, and gears with the wheels C and C which are attached to the sliding frame D, by journals at F and F upon which the wheels C and C revolve.

A is a concentric wheel. C and C which gear into it are oval shaped eccentrics. The shaft B, passes through a slot in the frame D which allows the frame D to slide over the shaft B.

As the longest part from the axis to the periphery of the wheels, C or C, is gradually brought in gear the frame D is caused to move out from the wheel A, and the axle of the wheels A, C, C, being in a straight line a reciprocating motion is produced at each revolution of the wheels C and C. When great power is required the wheel A must be small in proportion to the wheels C and C, and vice-versa, always giving a proportionate increase of power with the decrease of motion.

What I claim and desire to secure by Letters Patent, is—

The arrangement and combination of the reciprocating sliding frame D, with the wheels C A and C, when the parts or their equivalents are all arranged as a whole, substantially in the manner and for the purposes set forth.

DAVID M. BOYD.

Witnesses:
H. W. ELLSWORTH,
JOHN H. REDSTONE.